United States Patent
Ogawa

(10) Patent No.: US 9,644,979 B2
(45) Date of Patent: May 9, 2017

(54) TRAVEL SUPPORT DEVICE, TRAVEL SUPPORT METHOD, AND DRIVE SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/597,862

(22) Filed: Jan. 15, 2015

(65) Prior Publication Data

US 2015/0241234 A1    Aug. 27, 2015

(30) Foreign Application Priority Data

Feb. 24, 2014   (JP) .................................. 2014-033467

(51) Int. Cl.
*G01C 21/34* (2006.01)
*B60W 20/12* (2016.01)
*B60W 50/00* (2006.01)
*B60W 10/06* (2006.01)
*B60W 10/08* (2006.01)

(52) U.S. Cl.
CPC ......... *G01C 21/3469* (2013.01); *B60W 10/06* (2013.01); *B60W 10/08* (2013.01); *B60W 20/12* (2016.01); *B60W 50/0097* (2013.01); *B60W 2510/244* (2013.01); *B60W 2550/20* (2013.01); *B60W 2550/402* (2013.01); *Y02T 10/6291* (2013.01); *Y02T 10/84* (2013.01)

(58) Field of Classification Search
CPC ............ G01C 21/3469; B60W 20/104; B60W 50/0097

USPC ........................................................... 701/22
See application file for complete search history.

(56) References Cited

U.S. PATENT DOCUMENTS

| | | | |
|---|---|---|---|
| 2003/0015358 A1* | 1/2003 | Abe | B60K 6/48 180/65.25 |
| 2011/0172867 A1* | 7/2011 | Yu | B60K 6/445 701/22 |
| 2011/0276209 A1 | 11/2011 | Suganuma et al. | |
| 2013/0289815 A1* | 10/2013 | Suzuki | B60K 6/445 701/22 |

(Continued)

FOREIGN PATENT DOCUMENTS

| | | |
|---|---|---|
| JP | 2006-109577 A | 4/2006 |
| JP | 2007-050888 A | 3/2007 |

(Continued)

*Primary Examiner* — Yazan Soofi
(74) *Attorney, Agent, or Firm* — Oliff PLC

(57) ABSTRACT

A travel support device includes a mode planner. The mode planner selects one of a first mode, in which the state of charge of a battery is not maintained, and a second mode, in which the state of charge of the battery is maintained, based on a road load in each section on a travel route, thereby planning a travel mode. The mode planner selects from the travel route a first priority section, which is a section to be planned by giving priority to the first mode as a travel mode based on information on the travel route. The mode planner replans the travel mode when the vehicle is currently traveling at the first mode and also the remaining charge of the battery is less than the remaining charge of the battery necessary for traveling in the thus selected first priority section.

7 Claims, 5 Drawing Sheets

(56) References Cited

U.S. PATENT DOCUMENTS

| | | | |
|---|---|---|---|
| 2014/0046595 A1* | 2/2014 | Segawa | G01C 21/34 701/541 |
| 2014/0129070 A1* | 5/2014 | Lutz | B60L 11/1862 701/22 |
| 2015/0057860 A1* | 2/2015 | Katakura | B60K 6/48 701/22 |

FOREIGN PATENT DOCUMENTS

| | | |
|---|---|---|
| JP | 2009-012605 A | 1/2009 |
| JP | 2011-016464 A | 1/2011 |
| JP | 2013-177089 A | 9/2013 |

\* cited by examiner

TRAVEL SUPPORT DEVICE, TRAVEL SUPPORT METHOD, AND DRIVE SUPPORT SYSTEM

BACKGROUND OF THE INVENTION

The present invention relates to a travel support device, a travel support method, and a drive support system that manage adaptation of a plurality of travel modes of a vehicle.

Conventionally, as a vehicle provided with a plurality of travel modes as described above, a hybrid vehicle that uses both an internal combustion engine and a motor as its drive sources is known. The hybrid vehicle has a plurality of travel modes including a first mode (EV mode), in which the state of charge of the battery is not maintained by giving priority to EV travel, which stops the internal combustion engine and travels using only the motor, and a second mode (HV mode), in which the state of charge of the battery is maintained by giving priority to HV travel, which uses both the internal combustion engine and the motor to travel. Further, a travel support device that includes a navigation system and the like installed in the hybrid vehicle calculates a travel route from the current location to a destination based on map information and road traffic information and selects a travel mode to be adapted to each section which is a dividing unit of the travel route. For example, Japanese Laid-Open Patent Publication No. 2009-12605 discloses an example of a controller of a vehicle having such travel support functions.

In the controller of the vehicle disclosed in the above-described publication, travel modes of the individual sections on a travel route are set, with consideration given to the entire energy balance of the travel route so that the remaining charge of the battery, which is a rechargeable battery, becomes zero at the destination. However, prediction may be incorrect depending on factors such as changes in traffic flow, and the remaining charge of the battery may decrease faster than the prediction. In such a case, the travel mode may be changed to a second mode in a first priority section, where travel at the first mode is desired to be given priority. As a result, an uncomfortable sensation may be experienced by the driver.

The above-described problem is generally common to devices and methods that assign travel modes to a vehicle having a plurality of travel modes with a different energy balance.

SUMMARY OF THE INVENTION

An object of the present invention is to provide a travel support device, a travel support method, and a drive support system that are capable of facilitating correct planning of travel modes at each section on a travel route.

To achieve the foregoing objective, a first aspect of the present invention provides a travel support device for supporting movement of a vehicle having an internal combustion engine and a motor as drive sources from a current location to a destination. The travel support device includes a mode planner that selects, in each of a plurality of sections defined by dividing a travel route from the current location to the destination and based on a road load associated with each section, one of a first mode, in which the state of charge of a battery is not maintained, and a second mode, in which the state of charge of the battery is maintained, thereby planning a travel mode. The mode planner selects a first priority section, which is a section to be planned by giving a priority to the first mode as a travel mode from the travel route based on information on the travel route. The mode planner replans the travel mode when the vehicle is currently traveling at the first mode and also the remaining charge of the battery is less than the remaining charge of the battery necessary for traveling in the thus selected first priority section.

To achieve the foregoing objective, a second aspect of the present invention provides a travel support method for supporting movement of a vehicle having an internal combustion engine and a motor as drive sources from a current location to a destination. The travel support method includes: planning a travel mode by using a mode planner, which selects, in each of a plurality of sections defined by dividing a travel route from the current location to the destination and based on a road load associated with each section, one of a first mode, in which the state of charge of a battery is not maintained, and a second mode, in which the state of charge of the battery is maintained; selecting a first priority section, which is a section to be planned by giving a priority to the first mode as a travel mode from the travel route based on information on the travel route; and replanning the travel mode under the condition that the vehicle is currently traveling at the first mode and also the remaining charge of the battery is less than the remaining charge of the battery necessary for traveling in the thus selected first priority section.

To achieve the foregoing objective, a third aspect of the present invention provides a drive support system for supporting movement of a vehicle having an internal combustion engine and a motor as drive sources from a current location to a destination. The drive support system supports driving of the vehicle based on one travel mode selected from a plurality of different travel modes planned for each of a plurality of sections defined by dividing a travel route from the current location to the destination. The drive support system is provided with the travel support device according to the first aspect. The travel support device selects one travel mode from the plurality of travel modes in each section of the travel route, thereby planning the travel mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Hereinafter, a description will be given of a travel support device, a travel support method and a drive support system according to a first embodiment with reference to FIG. 1 to FIG. 3. The travel support device, the travel support method, and the drive support system of the present embodiment are adapted to a hybrid vehicle having drive sources, that is, an electric motor using a battery composed of a rechargeable battery as a power source and an internal combustion engine using gasoline and other fuels as a power source.

Figure 1:
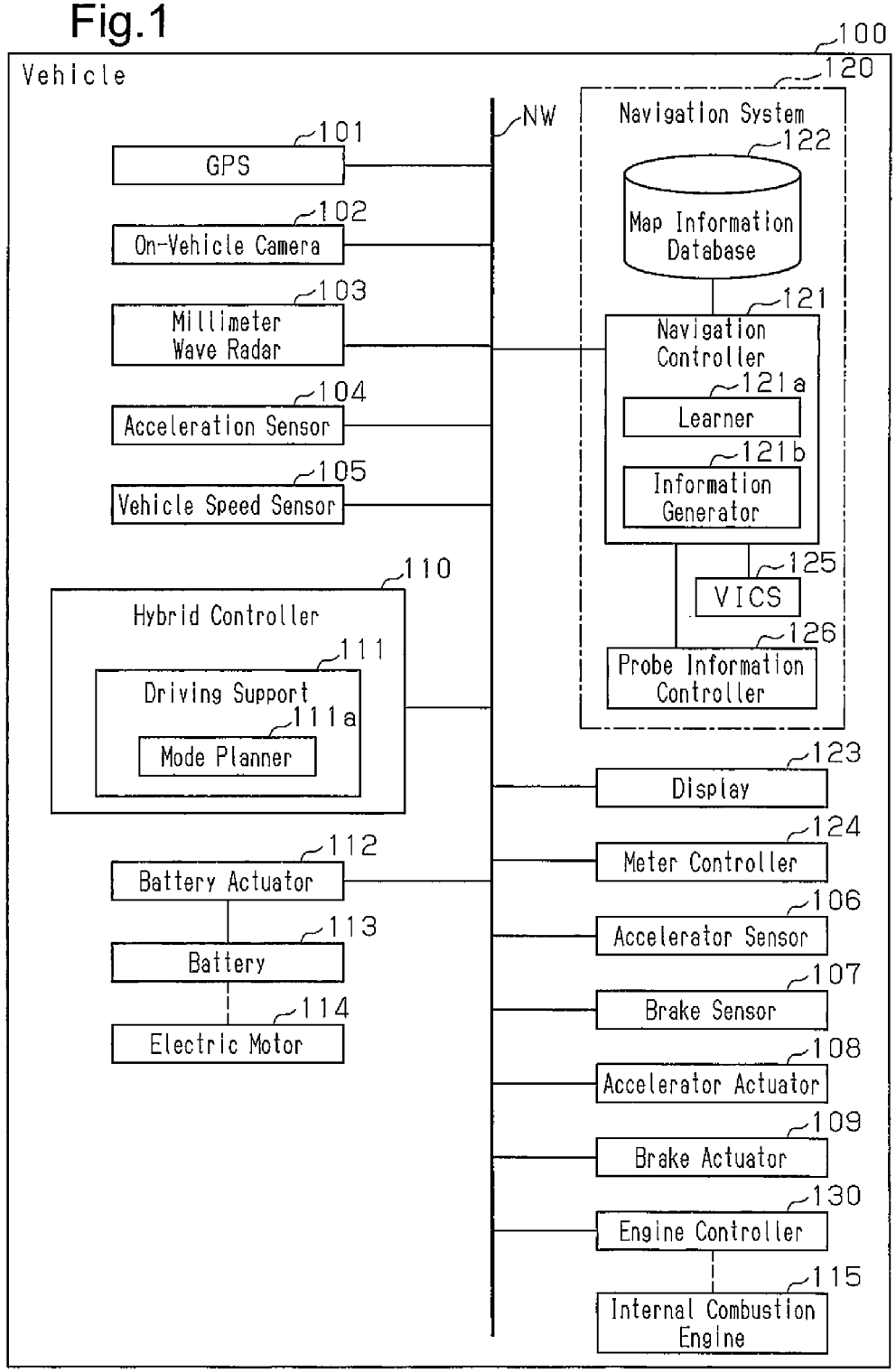
FIG. 1 is a block diagram showing a schematic configuration of a travel support device of a first embodiment.

As shown in FIG. 1, a vehicle 100 has devices detecting a traveling state of the vehicle 100, for example, a global positioning system (GPS) 101, an on-vehicle camera 102, a millimeter wave radar 103, an acceleration sensor 104, and a vehicle speed sensor 105. The GPS 101, the on-vehicle camera 102, the millimeter wave radar 103, the acceleration sensor 104, and the vehicle speed sensor 105 are connected to a hybrid controller 110, a navigation controller 121 of the navigation system 120, and an engine controller 130 via an on-vehicle network NW such as a controller area network (CAN). Further, each of the hybrid controller 110, the navigation controller 121 and the engine controller 130 is a so-called electronic control unit (ECU) and includes a small computer having an arithmetic device and a storage device (memory). The hybrid controller 110, the navigation controller 121 and the engine controller 130 can perform various types of control by executing programs stored at the storage device and calculating parameters by the arithmetic device.

The GPS 101 receives signals from GPS satellites and detects the position of the vehicle 100, for example, the latitude and longitude based on the thus received signals from the GPS satellites. Further, the GPS 101 outputs location information, which is information indicating the position (the latitude and longitude) of the thus detected vehicle 100. The on-vehicle camera 102 takes images of the surrounding environment of the vehicle 100 and outputs the data of the taken images. The millimeter wave radar 103 detects the presence of an object in the vicinity of the vehicle 100 by using radio waves in the millimeter wave band and outputs a signal corresponding to the result of the detection.

The acceleration sensor 104 detects acceleration of the vehicle 100 and outputs a signal corresponding to the detected acceleration. The vehicle speed sensor 105 detects the rotational speed of a wheel of the vehicle 100 and outputs a signal corresponding to the thus detected rotational speed.

An accelerator sensor 106 detects a depression amount of an accelerator pedal by the driver and outputs a signal corresponding to the depression amount of the thus detected accelerator pedal. A brake sensor 107 detects a depression amount of a brake pedal by the driver and outputs a signal corresponding to the depression amount of the thus detected brake pedal.

Further, the vehicle 100 is provided with an accelerator actuator 108, which controls the driving state of an internal combustion engine 115, and a brake actuator 109, which controls the brake. The accelerator actuator 108 and the brake actuator 109 are electrically connected to the on-vehicle network NW. The accelerator actuator 108 controls the internal combustion engine 115 based on a control amount of the internal combustion engine 115, which is calculated by an engine controller 130 according to a detection value of the accelerator sensor 106. Still further, the brake actuator 109 controls the brake based on a control amount of the brake, which is calculated by the engine controller 130 according to a detection value of the brake sensor 107.

The vehicle 100 is also provided with a battery 113, which is a power source of an electric motor 114 serving as a drive source, and a battery actuator 112, which controls charging/discharging of the battery 113. The battery actuator 112 is electrically connected to the on-vehicle network NW. The battery actuator 112 manages the state of the battery 113 such as the charging/discharging state. Further, the battery actuator 112 drives the electric motor 114 by controlling the discharge of the battery 113 and charges the battery 113 through regeneration by the electric motor 114.

The vehicle 100 is provided with a hybrid controller 110, which controls the respective driving states of the internal combustion engine 115 and the electric motor 114. The hybrid controller 110 is electrically connected via the on-vehicle network NW to the battery actuator 112, the accelerator actuator 108 and the brake actuator 109.

The hybrid controller 110 determines a driving force distribution of the internal combustion engine 115 and the electric motor 114, that is, an output ratio, based on the detection results of the acceleration sensor 104, the vehicle speed sensor 105 and the accelerator sensor 106. In particular, the hybrid controller 110 adjusts the remaining charge of the battery 113 that is an energy remaining charge of the battery 113 by changing the driving force distribution of the internal combustion engine 115 and the electric motor 114. The hybrid controller 110 performs EV travel, in which the internal combustion engine 115 is stopped and the electric motor 114 is used as a drive source, or HV travel, in which the internal combustion engine 115 and the electric motor 114 are used as drive sources.

The hybrid controller 110 selects, whenever necessary, one of a charge depleting (CD) mode, which is a mode for consuming the state of charge of the battery 113, and a charge sustaining (CS) mode, which is a mode for maintaining the state of charge of the battery 113.

The CD mode is a mode that positively consumes electricity charged in the battery 113 without maintaining the state of charge of the battery 113, that is, a mode for giving priority to EV travel. Hereinafter, the CD mode will be described as an EV mode. The internal combustion engine 115 will be driven even in the EV mode when the accelerator pedal is depressed harder and increased travel power is required.

The CS mode is a mode that maintains the state of charge of the battery 113 within a predetermined range in relation to a reference value. The CS mode is also a mode that drives the internal combustion engine 115, whenever necessary, to maintain the state of charge to cause the electric motor 114 to perform regeneration, thereby giving priority to HV travel. Hereinafter, the CS mode will be described as a HV mode. The internal combustion engine 115 is stopped even at the HV mode when the state of charge of the battery 113 exceeds the reference value. The reference value of the HV mode is set, whenever necessary, as a value of the state of charge when the EV mode is changed to the HV mode or as a value of the state of charge necessary for maintaining performance of the battery 113.

On the basis of the driving force distribution at the selected EV mode or HV mode, the hybrid controller 110 generates control commands of the battery actuator 112 about discharge and the like of the battery 113 and information on a control amount of the internal combustion engine 115 to be calculated by the engine controller 130. The hybrid controller 110 also determines the distribution of the braking force of the brake and that of the electric motor 114 based on the detection results of the acceleration sensor 104, the vehicle speed sensor 105 and the brake sensor 107. The hybrid controller 110 generates control commands of the battery actuator 112 on charge and the like of the battery 113 and information on a control amount of the brake, which is calculated by the engine controller 130 based on the braking force distribution. That is, the hybrid controller 110 outputs the generated control commands to the battery actuator 112, thereby controlling charging/discharging of the battery 113. Because of this, the electric motor 114, which uses the battery 113 as the power source (electric power force) is driven by discharge of the battery 113, and the battery 113 is charged through regeneration of the electric motor 114. Further, the hybrid controller 110 is able to monitor the execution state of hybrid control and the charged rate of the battery 113.

The hybrid controller 110 controls switching between the EV mode and the HV mode according to the results of selection made by the driver of the vehicle 100. Further, the hybrid controller 110 has functions to automatically switch a travel mode between the EV mode and the HV mode, thereby controlling the switching of the travel mode between the EV mode and the HV mode based on information on a road load necessary for traveling at each sections on a travel route of the vehicle 100 input from the navigation controller 121. The road load is the amount of load per unit distance at a section and the average load amount necessary for traveling in the section. An accumulated value of the road load necessary for complete travel of the section is defined as consumption energy.

Further, the vehicle 100 is provided with a map information database 122, in which map data has been registered. The map data is data covering geography such as roads. The map data registers information on locations such as latitude and longitude, together with data classified for types of display that can display the geography. The data classified for types of display includes display information displaying rivers, lakes, beaches and others. Further, the map data may register information on intersection names, road names, district names, directional guides and facilities.

Further, the map information database 122 includes node data, which is information on nodes indicating locations on roads, and link data, which is information on links as sections between two nodes. Nodes are set on the road at locations of specific traffic elements such as an intersection, a signal and a curve, and a site at which the number of lanes is changed. The node data includes location information on nodes and road information on the location. A link is set between two nodes as a section defined by the two nodes. The link data includes information on the two nodes and road information on the section of the link. The road load can be obtained or calculated from information on the road load included in the link data. The road information on the section of the link includes a starting point, an ending point, a distance, a route and undulations. Further, the link data includes various types of data such as cost data including the road load of the section of the link, road data including types of roads, mark data indicating a specific location, intersection data indicating information on an intersection and facility data indicating information on facilities.

More specifically, the node data may be configured with, for example, node IDs which are identification numbers of nodes, coordinates of nodes, link IDs of all links connected to the nodes and node types indicating types of intersections and junctions. Further, the node data may be configured so as to include data indicating node characteristics such as image IDs which are the identification numbers of images representing the nodes.

The link data is also configured with, for example, link IDs, which are the identification numbers of the links, link lengths, and node IDs of individual nodes connected to initial points and terminal points. To data indicating types of roads such as expressways, toll roads, ordinary roads, urban/suburban roads, mountain roads, tunnels, bridges and interchanges, the link data includes necessary information among data indicating road widths, the number of lanes, traveling time along links, legal traveling speeds and road gradients. Moreover, the link data may include data indicating averages, maximum values, minimum values and the like of moving time, moving speed, consumed fuel amount, and consumed power amount and the like, as road load information that is a required output of the vehicle 100 in each link. The consumed power amount is a power amount consumed by the electric motor 114 when the vehicle 100 travels in the EV mode. The road load of the link (section) is obtained or calculated based on the above-described road load information. The road load is an average value in a link (section) and the unit of the road load is [kW]. Further, the consumption energy as an accumulated value of the road load necessary for complete travel of each link can be calculated from the road load and a link length (section length).

The vehicle 100 has a navigation system 120, which provides route guidance or the like. A navigation controller 121 of the navigation system 120 obtains the current location point (latitude and longitude) of the vehicle 100 from the GPS 101. Further, when a destination is set by the driver, the navigation controller 121 identifies the latitude and longitude of the destination. Next, the navigation controller 121 searches a travel route from the current location of the vehicle 100 to the destination by referring to the map information database 122, for example, with use of Dijkstra's algorithm.

The navigation controller 121 is provided with a learner 121a, which learns the moving time, the moving speed, the consumed fuel amount, and the consumed power amount on a travel route where the vehicle 100 has traveled. The learner 121a configures a part of the travel support device. The learner 121a exhibits its functions when the navigation controller 121 executes and processes programs. The learner 121a obtains the moving time, the moving speed, the consumed fuel amount and the consumed power amount at each section on a travel route from various types of sensors and stores the information on these matters in association with each section of the map information database 122. The learner 121a accumulates the information in association with each section of the map information database 122 each time of traveling in the same section, thereby improving the accuracy of information on each section.

Further, the navigation controller 121 is provided with an information generator 121b, which generates information such as the road load that is referred to when planning a travel mode. The information generator 121b constitutes a part of the travel support device. The information generator 121b exhibits functions when the navigation controller 121 executes and processes programs. In particular, the information generator 121b has functions to calculate the road load at each section on a travel route based on gradient information and traffic congestion information at the section. The information generator 121b calculates the road load at normal travel time based on vehicle information such as the moving speed, the moving time, the consumed fuel amount and the consumed power amount of the vehicle 100 as well as information on traveling environment. Next, the learner 121a stores the road load in association with each section of the map information database 122.

The navigation controller 121 is connected with a vehicle information and communication system (VICS: registered trade mark) 125, which obtains traffic congestion information, information on amount of time required, accident information, disabled vehicle information, construction information and information on speed limit/lane closure. Further, the navigation controller 121 is connected with a probe information controller 126, which obtains probe traffic information. The probe traffic information is road traffic information that is generated by using information on actually traveled locations and vehicle speeds obtained from a data center and vehicles that share the information. Therefore, the information generator 121b obtains the traffic congestion information from both or one of the VICS 125 and the probe information controller 126, thus making it possible to assess a section which has traffic congestion, among the sections on a travel route.

Next, the navigation controller 121 outputs the information that indicates the travel route searched and the road load, the moving time, the moving speed, the consumed fuel amount, and the consumed power amount, which have been calculated to the hybrid controller 110 via the on-vehicle network NW and also outputs the information on a display 123 composed of a liquid crystal display and the like installed in a passenger compartment via the on-vehicle network NW.

Further, the vehicle 100 is provided with a meter controller 124, which controls display states of meters displayed on an instrument panel installed on a dashboard. The meter controller 124 obtains data indicating, for example, a charging/discharging state and the like of the battery 113 from the hybrid controller 110 and visually displays, for example, an energy flow inside the vehicle 100 based on the thus obtained data. The energy flow is the flow of energy in the vehicle 100 that is generated by charging/discharging of the battery 113 and driving force/regeneration of the electric motor 114. The energy flow may include a flow of energy in the vehicle 100, which is generated by the driving force and the like of the internal combustion engine 115.

When a travel route is input, the hybrid controller 110 assigns a travel mode to each section on the travel route. The hybrid controller 110 is provided with a driving support 111, which supports the assignment of the travel mode corresponding to the travel route. The driving support 111 obtains the travel route information to a destination point set by the driver from the navigation controller 121.

Further, the driving support 111 is provided with a mode planner 111a which executes planning of a travel mode to be assigned to the sections of the thus obtained travel route. The mode planner 111a constitutes a part of the travel support device. The mode planner 111a exhibits its functions when the hybrid controller 110 executes and processes programs. The mode planner 111a has functions to plan a travel mode at each section corresponding to the road load in each section on a travel route, with an entire energy balance of the travel route taken into account. The mode planner 111a is programmed such that one of the EV mode in which the state of charge of the battery 113 is not maintained and the HV mode in which the state of charge of the battery 113 is maintained is selected to plan a travel mode.

In general, efficiency tends to be better by adapting the traveling by the electric motor 114 to a section smaller in road load. Further, the efficiency tends to be better by adapting the traveling by the internal combustion engine 115 to a section larger in road load. Thus, the hybrid controller 110 is to assign the EV mode to a section smaller in road load and assign the HV mode to a section larger in road load.

Among a plurality of target sections, the mode planner 111a assigns the EV mode to sections in an ascending order of road load by comparing the road load at the sections. Further, the mode planner 111a integrates the consumption energy of the sections to which the EV mode is assigned and subtracts the thus integrated consumption energy from the remaining energy charge of the battery 113. Next, the mode planner 111a continues to assign the EV mode to sections so that the integrated consumption energy will not exceed the remaining energy charge of the battery 113. Because of this, the mode planner 111a assigns the EV mode to the sections relatively low in road load among the sections on the travel route. Further, the mode planner 111a assigns the HV mode to the sections to which the EV mode has not been assigned.

Incidentally, the mode planner 111a plans a travel mode at each section on a travel route, with an entire energy balance of the travel route taken into account such that the remaining charge of the battery 113 will be zero at the destination. However, when prediction is incorrect due to a change in traffic flow and the remaining charge of the battery 113 is decreased earlier than the prediction, there is a possibility that the battery 113 may run out at a midpoint of the travel route. In this case, the driver has to travel at the HV mode in an EV priority section, at which traveling in the EV mode is given priority, and the driver may feel an uncomfortable sensation. Thus, the mode planner 111a selects an EV priority section from a travel route based on the travel route information replans the travel mode when the vehicle 100 is traveling in the EV mode and also the remaining charge of the battery 113 is less than the remaining charge of the battery necessary for traveling in the selected EV priority section.

That is, the mode planner 111a obtains information on whether a road in each section on a travel route is an ordinary road or an expressway from the map information database 122. The mode planner 111a obtains the traffic congestion information from one or both of the VICS 125 and the probe information controller 126 to assess a section that has traffic congestion. Here, the EV priority section in which the EV mode is set to be given priority as a travel mode is a section including an ordinary road, when the travel route includes an ordinary road and an expressway. Further, when the travel route includes a section that has traffic congestion (traffic congestion section), the traffic congestion section is given as the EV priority section. Because of this, the mode planner 111a selects a section that includes an ordinary road as the EV priority section when the travel route includes an ordinary road and an expressway, and selects a traffic congestion section as the EV priority section when the travel route includes the traffic congestion section. Thereby, it is possible to facilitate proper planning of the travel mode in each section on the travel route.

The mode planner 111a also outputs on the display 123 a travel mode planned for each of the plurality of sections on the travel route as described above and allows the display 123 to display a travel mode planned at the current traveling section.

The hybrid controller 110 obtains information on the current traveling location, whenever necessary, thereby identify the current traveling section, in other words, the current section. The hybrid controller 110 controls the vehicle 100 such that the vehicle 100 travels at a travel mode planned for the thus identified section. That is, the hybrid controller 110 switches between the EV mode and the HV mode to which the travel mode of the vehicle 100 is assigned, each time when the travel route of the vehicle 100 is changed. Because of this, the vehicle 100 travels in a travel mode planned for the current traveling section (current section).

Next, a description will be given of the planning process of a travel mode by the mode planner 111a of the driving support 111 together with operations thereof, with reference to FIG. 2 and FIG. 3.

Each time a travel route is transmitted from the navigation controller 121, the driving support 111 plans a travel mode for each of the plurality of sections on the travel route. Further, the mode planner 111a replans the travel mode for each predetermined cycle of planning.

Figure 2:
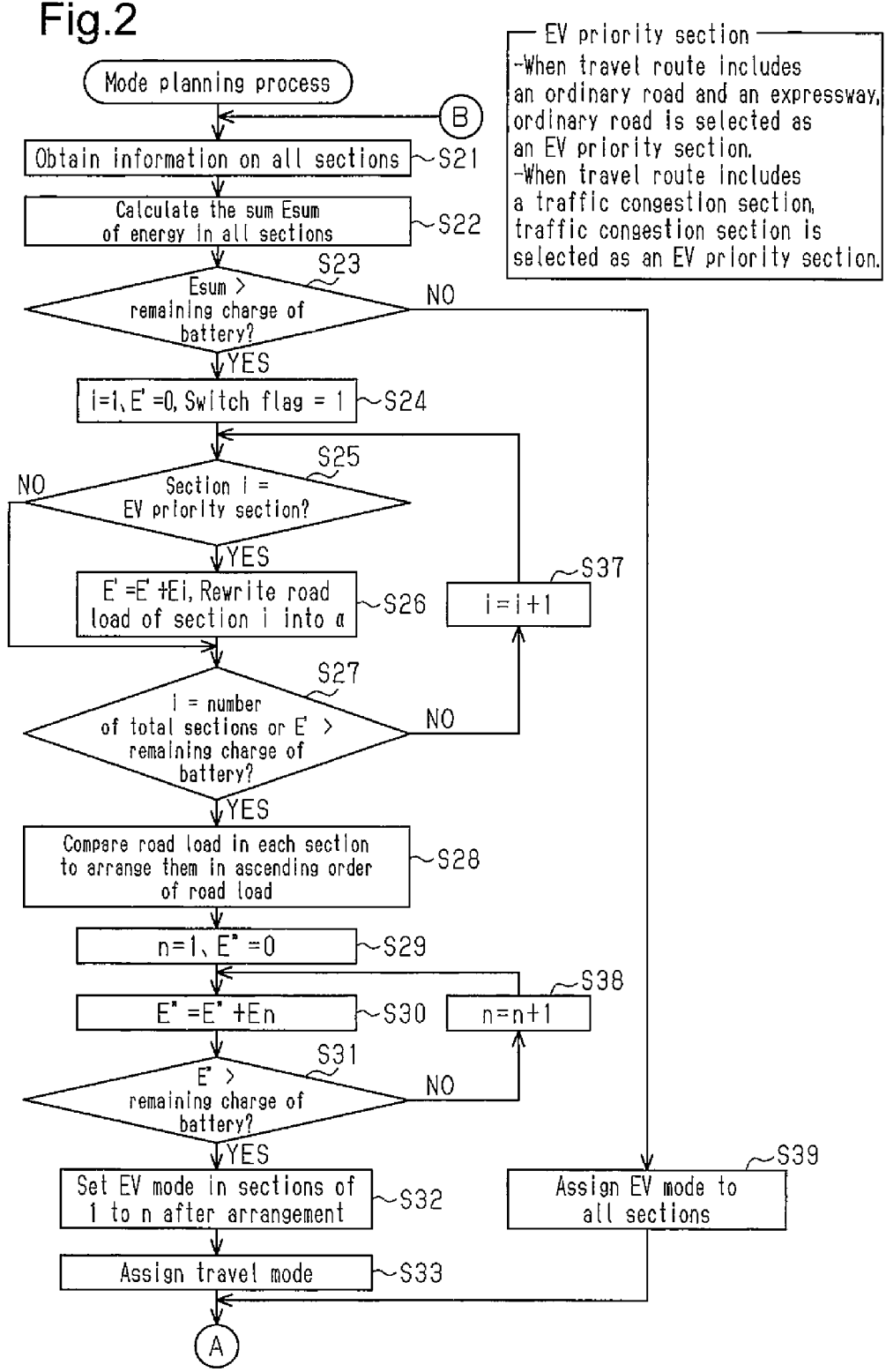
FIG. 2 is a flowchart showing a travel mode planning process by the travel support device of the first embodiment.
Figure 3:
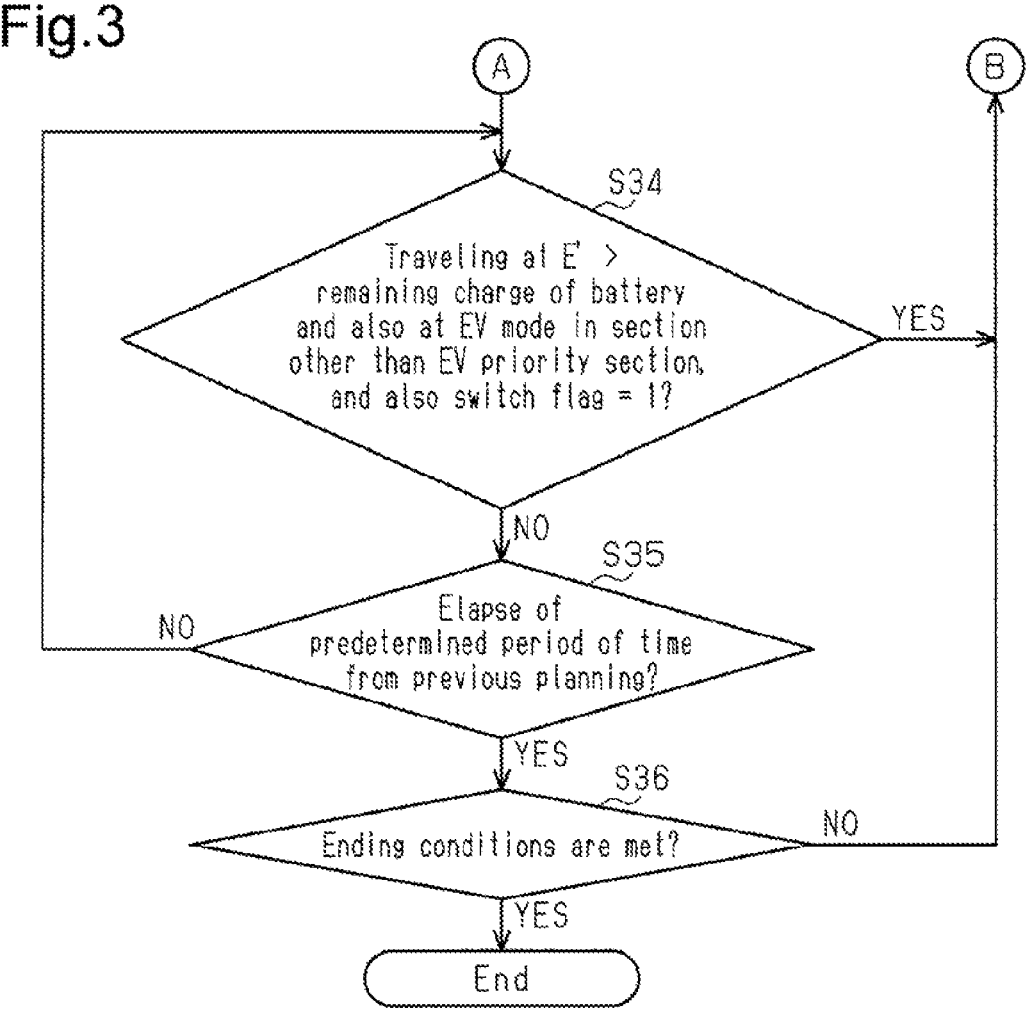
FIG. 3 is a flowchart showing a travel mode planning process by the travel support device of the first embodiment.

As shown in FIG. 2 and FIG. 3, when the navigation controller 121 sets a destination point, the driving support 111 obtains route information on all the sections on the travel route (Step S21).

Next, the driving support 111 calculates the sum Esum of consumption energy in all sections of the travel route (Step S22). The driving support 111 determines whether the sum Esum of consumption energy in all the sections of the travel route is greater than the remaining charge of the battery 113 (Step S23). That is, the mode planner 111a determines whether the vehicle is able to travel in the EV mode in all the sections of the travel route. Next, if the driving support 111 determines that the sum Esum of consumption energy in all the sections of the travel route is not greater than the remaining charge of the battery 113 (Step S23: NO), it assigns the EV mode to all the sections of the travel route (Step S39).

In contrast, if the driving support 111 determines that the sum Esum of consumption energy in all the sections on the travel route is greater than the remaining charge of the battery 113 (Step S23: YES), the following are set, that is, i=1 (where i varies from 1 to the number of total sections), the sum E' of consumption energy=0, and a switch flag=1 (Step S24). Here, the section i denotes an $i^{th}$ section. The consumption energy E' is the consumption energy of sections from the section 1 to the $i^{th}$ section. The switch flag is a flag that indicates that the vehicle is unable to travel in the EV mode in all the sections of the travel route.

Next, the driving support 111 determines whether the section i is an EV priority section (Step S25). That is, as described above, when the travel route includes an ordinary road and an expressway, the mode planner 111a selects a section including an ordinary road as the EV priority section, that is, it assigns the section to the EV priority section. When the travel route includes a traffic congestion section, it selects the traffic congestion section as the EV priority section, that is, it assigns the traffic congestion section to the EV priority section. Next, the mode planner 111a determines whether the section i is a section corresponding to the EV priority section. As a result, when the section i is a section not corresponding to the EV priority section (Step S25: NO), the driving support 111 proceeds to Step S27. That is, the mode planner 111a will not include the consumption energy of the section not corresponding to the EV priority section in the sum of the consumption energy to be calculated in Step S26.

Further, if the section i is a section corresponding to the EV priority section (Step S25: YES), the driving support 111 calculates the sum E' of the consumption energy in the EV priority sections from the section 1 to the section i (E'=E'+Ei), and rewrites the road load of the section i into α (Step S26). That is, the mode planner 111a rewrites the road load of the section i into α, a value that is lower than a value set on normal traveling. The consumption energy of the section i is not based on the rewritten road load α but adopted by calculation based on the road load obtained from the map information database 122.

Next, the driving support 111 determines whether the number i is in agreement with the number of total sections or the sum E' of the consumption energy of the EV priority sections from the section 1 to the section i is greater than the remaining charge of the battery 113 (Step S27). That is, the mode planner 111a determines whether a process for rewriting the road load can be ended by using as a trigger the fact that it has determined whether all the sections are the EV priority sections or the fact that the consumption energy necessary for traveling from the section 1 to the section i has exceeded the remaining charge of the battery 113. As a result, if the driving support 111 determines that the number i is not in agreement with the number of total sections, that is, that the number i is less than the number of total sections and that the sum E' of consumption energy of the EV priority sections from the section 1 to the section i is equal to or less than the remaining charge of the battery 113 (Step S27: NO), the driving support 111 increments the number i so that the next section becomes the target (i=i+1) (Step S37). Next, the driving support 111 repeats the process from Step S25.

In contrast, if the driving support 111 determines that the number i is in agreement with the number of total sections, that is, that the section i has reached the last section or the sum E' of the consumption energy of the EV priority sections from the section 1 to the section i is greater than the remaining charge of the battery 113 (Step S27: YES), road loads of the sections on the travel route are compared to arrange the sections in the order from the lowest road load (Step S28). That is, the mode planner 111a compares the road loads including the above-rewritten road load α to arrange them in order.

The driving support 111 defines each of the sections arranged in order from the lowest road load as section n (where n can be a value from 1 to the number of total sections). The driving support 111 also defines that when the section n=1, the consumption energy E"=0 (Step S29). The driving support 111 calculates the sum of consumption energy from the section 1 to the section n (E"=E"+En) (Step S30). The section n means the $n^{th}$ section of the thus arranged sections. The consumption energy of the section n is not based on the rewritten road load α but adopted by calculation based on the road load obtained from the map information database 122. The rewritten road load α is used only for arranging the sections in order based on the road loads.

Next, the driving support 111 determines whether the sum E" of consumption energy of sections from the section 1 to the section n is greater than the remaining charge of the battery 113 (Step S31). If the driving support 111 determines that the sum E" of consumption energy of the sections from the section 1 to the section n is equal to or less than the remaining charge of the battery 113 (Step S31: NO), it increments n so that the next section becomes a target (n=n+1) (Step S38). Next, the driving support 111 proceeds to the process of Step S30.

Further, if the driving support 111 determines that the sum E" of consumption energy of the sections from the section 1 to the section n is greater than the remaining charge of the battery 113 (Step S31: YES), it sets the sections from the first section to the $n^{th}$ section arranged in order as the EV mode (Step S32). Next, the driving support 111 assigns a travel mode to each section on the travel route (Step S33).

Next, the driving support 111 determines whether all following conditions are met: "the sum E' of consumption energy of the EV priority sections from the section 1 to the section i is smaller than the remaining charge of the battery 113," "the vehicle 100 is currently traveling in the EV mode in a section other than the EV priority section" and "the switch flag is 1". That is, the mode planner 111a executes the determination to facilitate replanning, when the vehicle travels in the EV mode in the sections other than the EV priority section, despite an insufficient amount of the remaining charge of the battery 113 necessary for the vehicle to travel in the EV mode in the EV priority sections from the section 1 to the section i, and, therefore, the vehicle cannot travel in the EV mode in all the sections on the travel route.

As a result, if the driving support 111 determines that all the following conditions are met: "the sum E' of consumption energy of the EV priority sections from the section 1 to the section i is greater than the remaining charge of the battery 113," "the vehicle 100 is currently traveling in the EV mode in a section other than the EV priority section" and "the switch flag is 1" (Step S34: YES), the driving support 111 repeats the process from Step S21. As described above, replanning of the travel mode is facilitated in a section other than the EV priority section. Therefore, it is possible to further suppress power consumption of the battery and easily secure the remaining charge of the battery that is to be consumed in the EV priority section.

Further, if the driving support 111 determines that at least one of the following conditions is met: "the sum E' of consumption energy of the EV priority sections from the section 1 to the section i is smaller than the remaining charge of the battery 113," "the vehicle 100 is currently traveling in the EV mode in a section other than the EV priority section" and "the switch flag is 1" is not met (Step S34: NO), it determines whether a predetermined period of time has passed from a previous mode plan (Step S35). As a result, if the driving support 111 determines that the predetermined period of time has not elapsed from the previous mode plan (Step S35: NO), the driving support 111 allows the process to proceed to Step S34.

Further, if the driving support 111 determines that the predetermined period of time has elapsed from the previous mode plan (Step S35: YES), it determines whether ending conditions are met (Step S36). That is, the mode planner 111a determines whether the ending conditions such as a slight remaining charge of the battery 113 are met. Next, if the remaining charge of the battery 113 is found, the driving support 111 determines that the ending conditions are not met (Step S36: NO), and it allows the process to proceed to Step S21 and executes replanning of the travel mode. In contrast, if the remaining charge of the battery 113 is only slight, the driving support 111 determines that the ending conditions are met (Step S36: YES) and ends the mode planning process.

In this embodiment, as described so far, based on the travel route information, the EV priority section is selected from a travel route. Replanning of the travel mode is carried out, if the vehicle 100 is currently traveling in the EV mode in a section other than an EV priority section and also the remaining charge of the battery 113 is less than the remaining charge of the battery necessary for the vehicle to travel in the EV mode in all the EV priority sections. Thus, replanning is carried out so that the vehicle travels in the EV mode in the EV priority sections. It is, thereby, possible to facilitate correct planning of the travel mode in each section on the travel route.

Further, in particular, in the present embodiment, the travel mode is replanned if it is determined that the vehicle 100 is traveling in the EV mode in a section other than the EV priority section when the remaining charge of the battery 113 is less than a necessary remaining charge of the battery. However, the travel mode may be replanned if it is determined that the vehicle 100 is traveling in the EV mode not only in a section other than the EV priority section, but also in the EV priory section when the remaining charge of the battery 113 is less than a necessary remaining charge of the battery. In this way, it is also possible to facilitate correct planning of the travel mode in each section of the travel route.

The present embodiment has the following advantages.

(1) When the vehicle 100 is currently traveling in the EV mode and also no remaining charge of the battery necessary for traveling in the EV priority section selected from a travel route can be secured, replanning of the travel mode is performed. That is, replanning is carried out so that the EV mode is given with priority to a section which is selected as the EV priority section. Thereby, it is possible to facilitate correct planning of the travel mode in each section of the travel route.

(2) The travel mode is replanned if it is determined that the vehicle 100 is traveling in the EV mode in a section other than the EV priority section when the remaining charge of the battery 113 is less than a necessary remaining charge of the battery. That is, it is possible to facilitate replanning of the travel mode in a traveling section where the consumption of the battery 113 is relatively high in the EV mode. Therefore, the consumption of the battery 113 is further suppressed to easily conserve the remaining charge of the battery that is to be consumed in an EV priority section.

(3) When the travel route includes both an ordinary road and an expressway, a section that includes the ordinary road is selected as the EV priority section. Therefore, it is possible to avoid an expressway that is high in road load and also secure the travel distance in the EV mode to a maximum extent.

(4) When the travel route includes a traffic congestion section, a section which has traffic congestion is selected as the EV priority section. That is, a section that has traffic congestion and is lower in road load than at the time of normal traveling is selected as the EV priority section. Therefore, it is possible to increase the travel distance in the EV mode.

Second Embodiment

Hereinafter, a description will be given of a travel support device, a travel support method and a drive support system according to a second embodiment with reference to FIG. 4 and FIG. 5.

In this embodiment, a description will be given of a specific process in which a travel route includes an ordinary road and an expressway. That is, this is a case where a section on a travel route is set as an EV priority section and a non-EV priority section based on the types of roads.

A mode planner 111a selects a section that includes an ordinary road on the travel route (ordinary road section) as an EV priority section. Further, the mode planner 111a rewrites a road load of a section including an expressway (expressway section) into a road load β, which is greater than the road load at the time of normal traveling. The road load β is used only when sections are arranged in order based on the road loads.

Next, a description will be given of the planning process of the travel mode by the mode planner 111a of a driving support 111 together with operations thereof.

Figure 4:
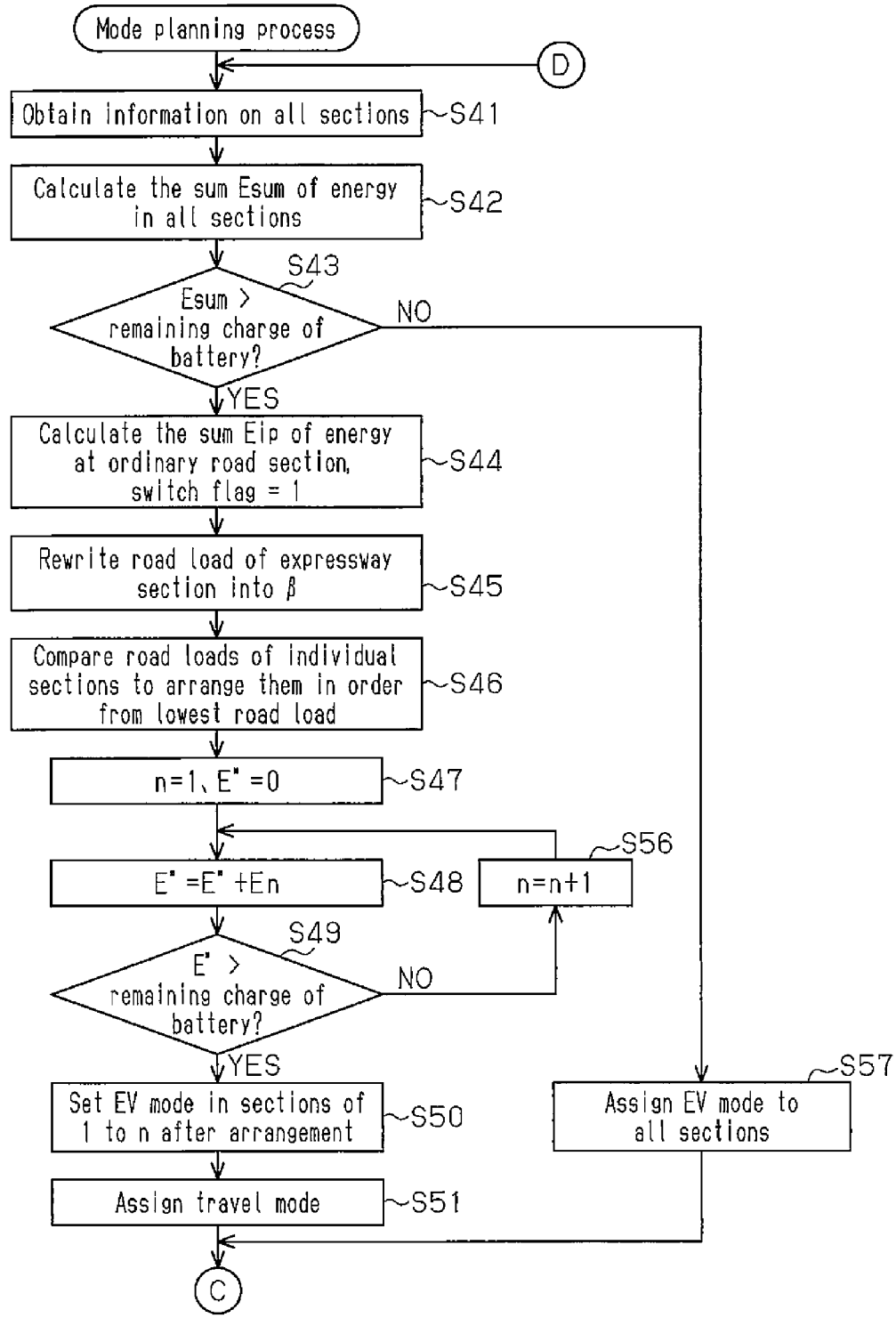
FIG. 4 is a flowchart which shows a travel mode planning process by a travel support device of a second embodiment.
Figure 5:
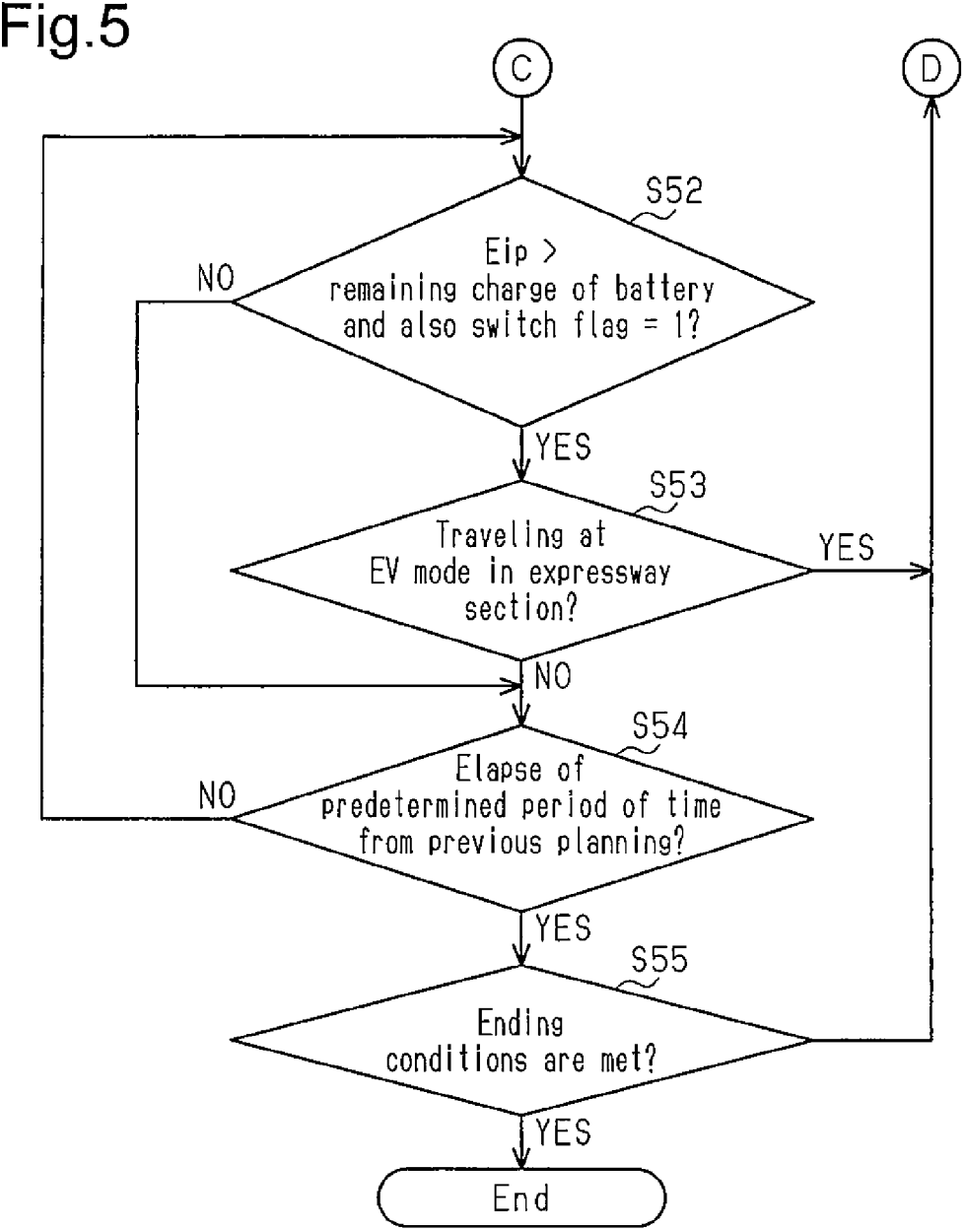
FIG. 5 is a flowchart which shows a travel mode planning process by the travel support device of the second embodiment.

As shown in FIG. 4 and FIG. 5, the driving support 111 obtains route information on all sections in the travel route when a navigation controller 121 sets a destination point (Step S41).

The driving support 111 calculates the sum Esum of consumption energy in all the sections on a travel route (Step S42). The driving support 111 determines whether the sum Esum of the consumption energy in all the sections on the travel route is greater than the remaining charge of a battery 113 (Step S43). That is, the mode planner 111a determines whether the vehicle is able to travel in the EV mode in all the sections on the travel route. Next, if the driving support 111 determines that the sum Esum of the consumption energy of all the sections on the travel route is not greater than the remaining charge of the battery 113 (Step S43: NO), it assigns the EV mode to all the sections on the travel route (Step S57).

In contrast, if the driving support 111 determines that the sum Esum of the consumption energy of all the sections on the travel route is greater than the remaining charge of the battery 113 (Step S43: YES), it calculates the sum Eip of the consumption energy of ordinary road sections and gives the switch flag=1 (Step S44). Next, the driving support 111 rewrites the road load of an expressway section into β (Step S45). That is, the mode planner 111a rewrites the road load of a section i into a value β, which is higher than a value set at the time of normal traveling.

Subsequently, the driving support 111 compares the road loads of individual sections on the travel route, thereby arranging the sections in order from the lowest road load (Step S46). That is, the mode planner 111a compares the road loads including the above-rewritten road load β to arrange the sections in order.

The driving support 111 defines each of the sections arranged in order from the lowest road load as section n (where n can be a value from 1 to the number of total sections). The driving support 111 also defines that when the section n=1, the consumption energy E"=0 (Step S47). The section n means the $n^{th}$ section among the thus arranged sections. The driving support 111 calculates the sum of the consumption energy from the section 1 to the section n (E"=E"+En) (Step S48). The consumption energy of the section n is not based on the rewritten road load β but adopted by calculation based on the road loads obtained from the map information database 122. The rewritten road load β is used only for arranging the sections in order based on the road loads.

Next, the driving support 111 determines whether the sum E" of the consumption energy of sections from the section 1 to the section n is greater than the remaining charge of the battery 113 (Step S49). If the driving support 111 determines that the sum E" of the consumption energy of sections from the section 1 to the section n is equal to or less than the remaining charge of the battery 113 (Step S49: NO), it increments n so that the next section becomes the target (n=n+1) (Step S56). Next, the driving support 111 repeats the process from the Step S48.

Further, if the driving support 111 determines that the sum E" of the consumption energy of sections from the section 1 to the section n is greater than the remaining charge of the battery 113 (Step S49: YES), sections of the first section to the $n^{th}$ section after they are arranged in order are set in the EV mode (Step S50). Next, the driving support 111 assigns the travel mode to each section on the travel route (Step S51).

Subsequently, the driving support 111 determines whether all the following conditions are met: "the sum Eip of the consumption energy in ordinary road sections is greater than the remaining charge of the battery 113" and "the switch flag is 1" (Step S52). As a result, if the driving support 111 determines that at least one of the conditions is not met: "the sum Eip of the consumption energy in ordinary road sections is greater than the remaining charge of the battery 113" and "the switch flag is 1" (Step S52: NO), it proceeds to Step S54.

Further, if the driving support 111 determines that all the following conditions are met: "the sum Eip of the consumption energy of ordinary road sections, is greater than the remaining charge of the battery 113" and "the switch flag is 1" (Step S52: YES), it determines whether the vehicle 100 is currently traveling in the EV mode in an expressway section (Step S53). As a result, if the driving support 111 determines that the vehicle 100 is currently traveling in the EV mode in the expressway section (Step S53: YES), it proceeds to Step S41 and replans the travel mode.

Further, if the driving support 111 determines that the vehicle 100 is not traveling in the EV mode in an expressway section (Step S53: NO), it determines whether a predetermined period of time has passed from a previous mode plan (Step S54). As a result, if the driving support 111 determines that the predetermined period of time has not passed from the previous mode plan (Step S54: NO), it allows the process to proceed to Step S52.

Further, if the driving support 111 determines that the predetermined period of time has passed from the previous mode plan (Step S54: YES), it determines whether ending conditions are met (Step S55). That is, the mode planner 111a determines whether the ending conditions, for example, that the remaining charge of the battery 113 is only slight, are met. Next, the driving support 111 determines that the ending conditions are not met, if the remaining charge of the battery 113 is found (Step S55: NO) and proceeds to Step S21, thereby replanning the travel mode. In contrast, the driving support 111 determines that the ending conditions are met if the remaining charge of the battery 113 is only slight (Step S55: YES), it ends the mode planning process.

As so far described, according to the present embodiment, instead of the advantages of the first embodiment (3), the following advantages can be obtained.

(5) If an EV priority section can be distinguished from a non-EV priority section according to types of roads on the travel route, sections according to the types of roads can be referred to distinguish the EV priority section from the non-EV priority section. Thereby, it is possible to rewrite the road load of each section into consumption energy Eip necessary for traveling in the EV priority section or a road load β necessary for traveling in the non-EV priority section. Thus, as compared with the first embodiment, it is possible to reduce processes in the mode plan.

The above described embodiment may be modified as follows.

In the above-described second embodiment, a description has been given of a case where on a travel route including an ordinary road and an expressway, the ordinary road is set as an EV priority section and the expressway section is set as a non-EV priority section. It is, however, acceptable that on a travel route that includes a section that has traffic congestion (traffic congestion section), the traffic congestion section is set as an EV priority section and a non-traffic congestion section is set as a non-EV priority section. Accordingly, as with the second embodiment, the travel mode can be replanned such that the vehicle travels in the EV mode at least in the EV priority section.

In the above-described embodiment, an illustration has been given of a case where the on-vehicle network NW is a CAN. However, the embodiment is not limited thereto, and the on-vehicle network NW may include any network such as Ethernet (registered trademark), FlexRay (registered trademark) and IEEE1394 (FireWire (registered trademark)), as long as it can connect electronic control units, such as ECUs, that are connected to the on-vehicle network NW in a communicative manner. Further, it may be configured by including the CAN and having above-described networks combined thereto. This improves the flexibility of configuration in the vehicle in which the travel support device is used.

In the above-described embodiment, the GPS 101 is connected to the navigation controller 121 via the on-vehicle network NW. However, the GPS 101 may be directly connected to the navigation controller 121.

In the above-described embodiment, an illustration has been given of a case where the navigation system 120 and the driving support 111 are different in configuration. However, the embodiment is not limited thereto, and the navigation system and the driving support may be installed on the same device. This improves the flexibility of configuration in the travel support device.

In the above-described embodiment, an illustration has been given of a case where the hybrid controller 110 and the driving support 111 are installed on the same device. However, the embodiment is not limited thereto, and the hybrid controller and the driving support may be installed on separate devices. This improves the flexibility of configuration in the travel support device.

In the above-described embodiment, an illustration has been given of a case where various devices such as the navigation system 120 and the display 123 are integrally provided on the vehicle 100. However, the embodiment is not limited thereto. When various devices such as the navigation system and the display are connected in a mutually communicative manner, a portable information processing device and the like such as a portable phone and a smartphone may be used as an entirety or a part of their functions. This improves the flexibility of design in the travel support device.

In the above-described embodiment, an illustration has been given of a case where the driving support 111, the navigation system 120, the map information database 122 and others are installed on the vehicle 100. However, the embodiment is not limited thereto. It is acceptable that some functions of the driving support, the navigation system and the map information database are provided in an information processing device outside the vehicle or on a portable information processing device. The information processing device outside the vehicle includes an information processing center. The portable information processing device includes a portable phone and a smartphone. As for the information processing device outside the vehicle, information may be transmitted and received via a wireless communication line. As for the portable information processing device, it may be connected to the on-vehicle network or connected by a short-range communication. Alternatively, it may transmit and receive information via the wireless communication line. This improves the flexibility of design of the travel support device.

In the above-described embodiment, there is provided the learner 121*a* which learns the moving time, the moving speed, the consumed fuel amount and the consumed power amount obtained on a travel route where the vehicle 100 has traveled. It is, however, acceptable that the learning functions learning on the travel route are omitted. This reduces the process necessary for learning.

In the above-described embodiment, an illustration has been given of a case where the travel mode is assigned by the driving support 111. However, the embodiment is not limited thereto. It is acceptable that the travel mode is assigned by the navigation controller or the like. This increases the flexibility of design of the travel support device.

In the above-described embodiment, an illustration has been given of a case where the travel mode is assigned mostly when the location of the vehicle 100 is at the current location. It is, however, acceptable that the travel mode is assigned at any site where the vehicle is moving to a destination point. Next, it is possible to assign an appropriate travel mode to all sections on the travel route upon execution at any site. This increases the flexibility of design of the travel support device.

Therefore, the present examples and embodiments are to be considered as illustrative and not restrictive and the invention is not to be limited to the details given herein, but may be modified within the scope and equivalence of the appended claims.

The invention claimed is:

1. A travel support device for supporting movement of a vehicle having an internal combustion engine and a motor as drive sources from a current location to a destination, the travel support device comprising:
   an electronic control unit configured to:
      select, in each of a plurality of sections defined by dividing a travel route from the current location to the destination and based on a road load associated with each section, one of a first mode, in which the state of charge of a battery is not maintained, and a second mode, in which the state of charge of the battery is maintained, thereby planning a travel mode,
      select a first priority section, which is a section to be planned by giving a priority to the first mode as a travel mode from the travel route based on information on the travel route, and
      replan the travel mode when:
         (i) the vehicle is currently traveling at the first mode in a section other than the first priority section, and
         (ii) a remaining charge of the battery is less than the remaining charge of the battery necessary for traveling in the selected first priority section, thereby reducing consumption of the battery in order to conserve the remaining charge of the battery to be consumed within sections selected as the first priority section.

2. The travel support device according to claim 1, wherein the electronic control unit is further configured to:
   select a section including an ordinary road as the first priority section when the travel route includes an ordinary road and an expressway.

3. The travel support device according to claim 1, wherein the electronic control unit is further configured to obtain traffic congestion information on the travel route, wherein, when the travel route includes a section in traffic congestion, the electronic control unit selects the section in traffic congestion as the first priority section.

4. A travel support method for supporting movement of a vehicle having an internal combustion engine and a motor as drive sources from a current location to a destination, the travel support method comprising:
   planning a travel mode by an electronic control unit configured to select, in each of a plurality of sections defined by dividing a travel route from the current location to the destination and based on a road load associated with each section, one of a first mode, in which the state of charge of a battery is not maintained, and a second mode, in which the state of charge of the battery is maintained;

selecting, by the electronic control unit, a first priority section, which is a section to be planned by giving a priority to the first mode as a travel mode from the travel route based on information on the travel route; and replanning, by the electronic control unit, the travel mode under the condition that:
(i) the vehicle is currently traveling at the first mode in a section other than the first priority section, and
(ii) a remaining charge of the battery is less than the remaining charge of the battery necessary for traveling in the selected first priority section, thereby reducing consumption of the battery in order to conserve the remaining charge of the battery to be consumed within sections selected as the first priority section.

5. A drive support system for supporting movement of a vehicle having an internal combustion engine and a motor as drive sources from a current location to a destination, wherein the drive support system supports driving of the vehicle based on one travel mode selected from a plurality of different travel modes planned for each of a plurality of sections defined by dividing a travel route from the current location to the destination, and the drive support system is provided with the travel support device, wherein the travel support device comprises: an electronic control unit configured to:

select, in each of a plurality of sections defined by dividing a travel route from the current location to the destination and based on a road load associated with each section, one of a first mode, in which the state of charge of a battery is not maintained, and a second mode, in which the state of charge of the battery is maintained, thereby planning a travel mode, select a first priority section, which is a section to be planned by giving a priority to the first mode as a travel mode from the travel route based on information on the travel route, and replan the travel mode when:
(i) the vehicle is currently traveling at the first mode in a section other than the first priority section, and
(ii) a remaining charge of the battery is less than the remaining charge of the battery necessary for traveling in the selected first priority section, thereby reducing consumption of the battery in order to conserve the remaining charge of the battery to be consumed within sections selected as the first priority section.

6. The travel support method according to claim 4, further comprising:
selecting, by the electronic control unit, a section including an ordinary road as the first priority section when the travel route includes an ordinary road and an expressway.

7. The travel support method according to claim 4, further comprising obtaining, by the electronic control unit, traffic congestion information on the travel route,
wherein, when the travel route includes a section in traffic congestion, the section in traffic congestion as the first priority section is selected.

* * * * *